Jan. 1, 1924
W. R. HOWARD ET AL
DESIGN CUTTING MACHINE
Filed Oct. 27, 1919
1,478,998
2 Sheets—Sheet 1
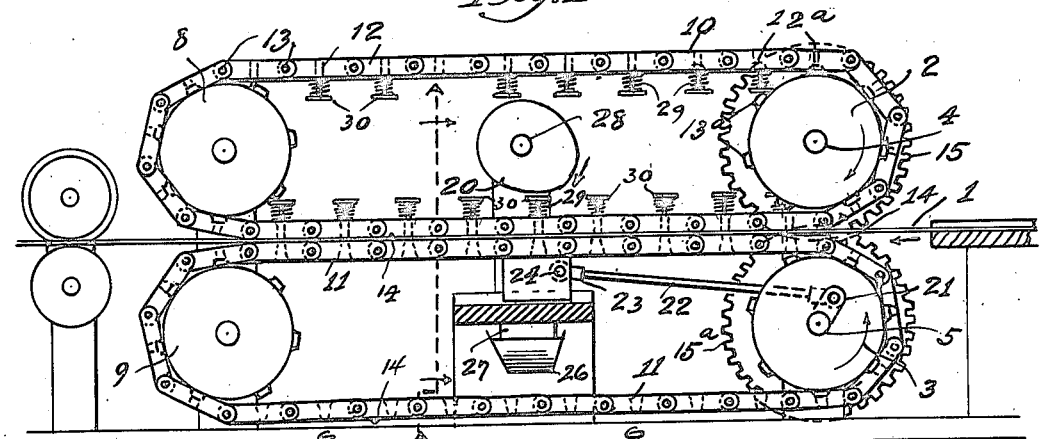
Fig. 1.
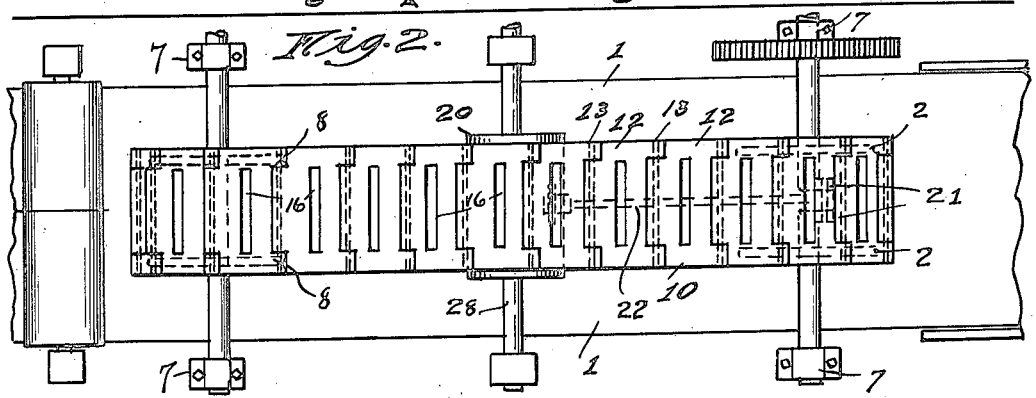
Fig. 2.
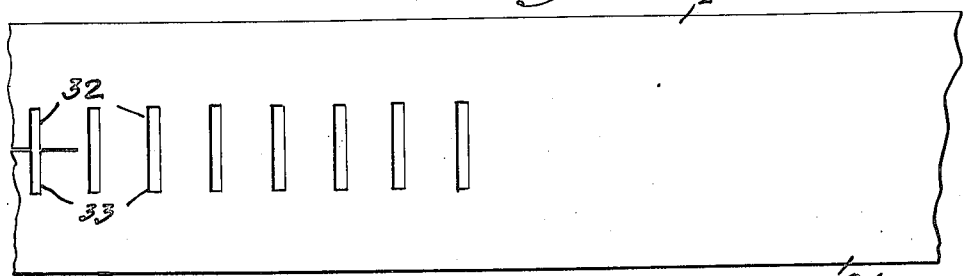
Fig. 3.
Fig. 4.
Witness,
E. S. Mann.
Inventors,
William R. Howard.
William H. Gregg.
By Frank L. Belknap, Atty.

Jan. 1, 1924 1,478,998
W. R. HOWARD ET AL
DESIGN CUTTING MACHINE
Filed Oct. 27, 1919 2 Sheets-Sheet 2
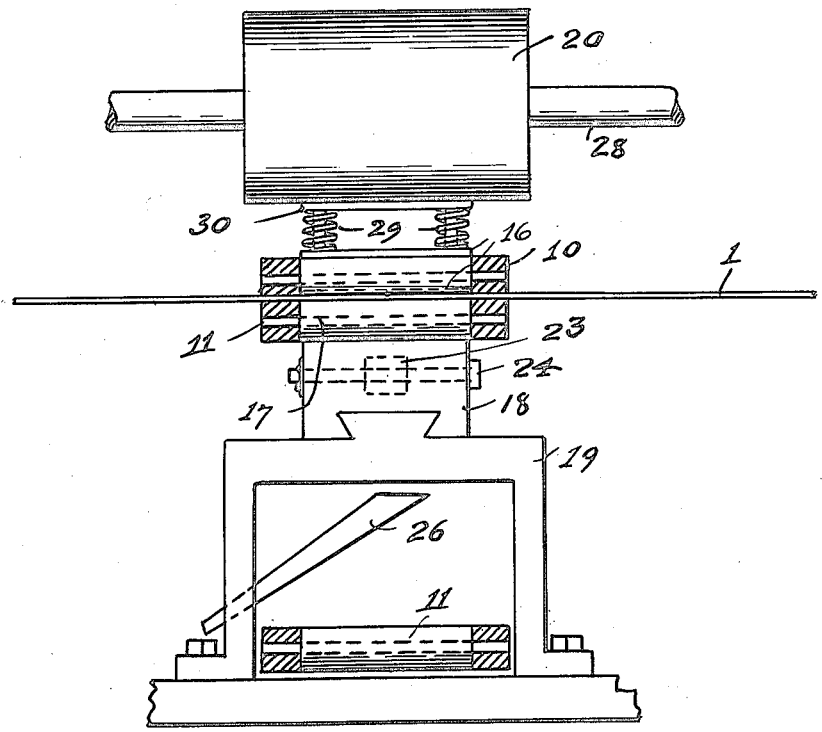
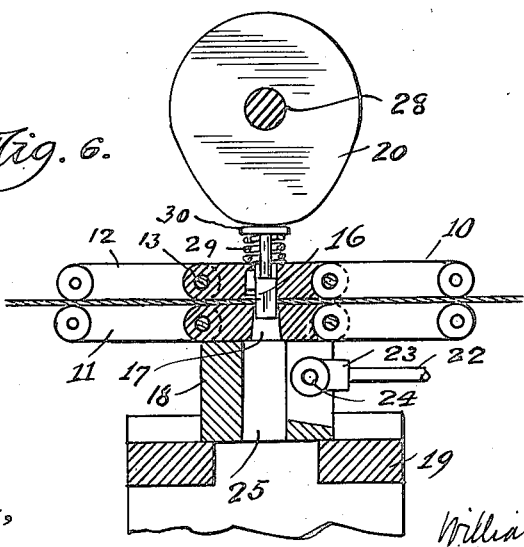

Patented Jan. 1, 1924.

1,478,998

UNITED STATES PATENT OFFICE.

WILLIAM R. HOWARD AND WILLIAM H. GREGG, OF CHICAGO, ILLINOIS, ASSIGNORS TO THE FLINTKOTE COMPANY, A CORPORATION OF MASSACHUSETTS.

DESIGN-CUTTING MACHINE.

Application filed October 27, 1919. Serial No. 333,576.

*To all whom it may concern:*

Be it known That we, WILLIAM R. HOWARD and WILLIAM H. GREGG, citizens of the United States, residing in the city of Chicago, county of Cook, and State of Illinois, have invented certain new and useful Improvements in Design-Cutting Machines, of which the following is a specification.

My invention relates to improvements in design cutting machines and has among its salient objects to provide a machine for perforating sheet materials.

It has among its salient objects to provide a machine in which the die members travel with the material as it passes through the machine; to provide a machine in which the perforating is done while the die members and material run along together through the machine, thereby insuring clean cut edges in the perforations.

Difficulties have attended previous attempts to cut perforations in roofing materials as it travels through the machine, due to the fact that the apertures were cut by means of circular cutters which make uneven edges and enlarged perforations caused by its rolling motion. My invention stamps out the design, leaving clean cut apertures in the material.

In the drawings:

Fig. 1 is a side elevation of the machine with parts in section and parts omitted.

Fig. 2 is a plan view of the machine shown in Fig. 1.

Fig. 3 is a plan view of roofing material as it would be in machine in Fig. 1.

Fig. 4 is a fragmentary plan view of section of completed roofing material after cutting.

Fig. 5 is a detail end view, partly in section, taken on line A—A, looking in the direction of arrows.

Fig. 6 is a fragmentary detail of perforating mechanism.

Referring to the drawings, 1 designates a sheet roofing material fed from any source (not shown) between the two sprocket rolls 2 and 3, mounted on shafts 4 and 5. The shafts are journalled in suitable bearings set on frame 6 and only the bearings 7 of the upper shaft shown in Fig. 2. Over these sprocket rolls 2 and 3 and sprocket rools 8 and 9, similarly mounted on the opposite end of the frame 6, rides the endless chains considered as a whole at 10 and 11. These chains are made up of link members 12 fastened together by means of pins 13. They are driven over the sprockets by means of raised portions 13$^a$ on the surface of the sprocket wheels engaging recesses 12$^a$ in the links.

For the purpose of gripping the material, there are small sharp pins 14 fixed at intervals on the outer surface of the lower chain links registering with recesses on outer surface of the links of the upper chain. These pins and recesses grip the material as it is fed into the machine and hold it firmly throughout its travel. Power for driving the machine is supplied from any convenient source to one of the shafts 4 or 5, and through the gears 15 and 15$^a$; the shafts and sprockets are geared to run at the same speed, the gripping chains traveling together so that the links register properly when gripping the roofing material.

The perforating mechanism consists of the following: The male die members 16 register with the female die members 17 in the links of the lower chain, the reciprocating block 18, stand 19 and cam 20 for operating male die members. The stand 19 is mounted near the center of the frame 6 and has a reciprocating block 18 slidably mounted upon its upper surface. The reciprocating movement is given to the block from the shaft 5 through the crank 21 and connecting rod 22 fastened to the block by means of connection 23, pivoted to the pin 24. There is a hole 25 in the block to allow the tabs that are cut from the material to drop into the chute 26 through a hole 27 in the stand 19 from which they are conveyed from the machine. The purpose of this reciprocating block is to move with the chains and die members while the material is being perforated, thereby furnishing a solid base for the stamping operation and assuring clean cut edges in the aperture cut. If stationary die and base members were used in connection with the moving material, it would produce an uneven or jagged hole.

As previously stated, the links of the two chains running along together with the material between them come under the cam 20. At this moment the cam, which is fixed to the shaft 28 and is rotated in any suitable manner from one of the sprockets, shafts or other means, is turned to actuate the die members 16 cutting the desired shape of aperture in the material. These male die members are fixed to the links of the upper chain, the female members being in the links of the lower chain. The male die members are brought back into inoperative position by means of compression springs 29, which are held between the die members and the contacting piece 30.

In Fig. 3 is shown the material as it would be in the machines in Fig. 1; the plain surface is shown at 31, the perforated portion at 32 and at 33, the cutter has just begun to divide the material in half. Fig. 6 shows fragments of the material after it has been cut.

We claim as our invention:

1. In a design cutting machine of the character described, the combination with two endless gripping chains arranged to firmly grip material and guide it continuously through the machine, of male and female die members fixed to chain links for perforating the material, means for actuating said die members at given and predetermined intervals, a reciprocating block operating beneath die members and furnishing solid base for die members during perforating operations.

2. In a machine of the character described, the combination with a pair of endless carriers adapted to grip a sheet of material and guide the same beneath said adjacent carriers, of die members fixed to said carriers for perforating the material during its travel therewith, actuating said die members at predetermined intervals, and a reciprocating element operating beneath said die members for furnishing a base therefor during perforating operations.

3. In a design cutting machine, the combination with a pair of endless gripping chains operated in pairs to bring them adjacent each other during a substantial portion of their movement, piercing tools carried by said chains, means for actuating one of said tools at predetermined intervals, and a movable base disposed beneath said tools during the operation thereof.

4. In a shingle strip cutting machine, the combination with endless carriers operated in pairs to bring them adjacent each other during a substantial portion of their movement, a strip adapted to be fed between said carriers and movable therewith, male and female dies carried by said carriers, means for operating the male die at a predetermined time, and a movable supporting element adapted to be disposed beneath said die members during the operation thereof.

WILLIAM R. HOWARD.
WILLIAM H. GREGG.